(12) United States Patent
Ito

(10) Patent No.: US 7,717,019 B2
(45) Date of Patent: May 18, 2010

(54) LATHE

(75) Inventor: Chihiro Ito, Inuyama (JP)

(73) Assignee: Murata Machinery, Ltd., Kyoto-shi (JP)

( * ) Notice: Subject to any disclaimer, the term of this patent is extended or adjusted under 35 U.S.C. 154(b) by 0 days.

(21) Appl. No.: 11/896,825

(22) Filed: Sep. 6, 2007

(65) Prior Publication Data

US 2008/0060492 A1   Mar. 13, 2008

(30) Foreign Application Priority Data

Sep. 7, 2006   (JP)   ............................. 2006-242402

(51) Int. Cl.
  *B23B 21/00*   (2006.01)
(52) U.S. Cl. ............................. 82/117; 82/132; 82/149
(58) Field of Classification Search .................... 82/117, 82/124, 132, 142, 146, 148, 901, 121, 122, 82/149; 409/137, 253; 29/27 C
  See application file for complete search history.

(56) References Cited

U.S. PATENT DOCUMENTS

| | | | | |
|---|---|---|---|---|
| 3,551,974 A * | 1/1971 | Fantoni | ...................... | 29/26 R |
| 4,148,235 A * | 4/1979 | Gerth | .......................... | 82/132 |
| 4,751,864 A * | 6/1988 | Leigh et al. | .................... | 82/148 |
| 5,078,256 A * | 1/1992 | Hatano et al. | ............... | 198/360 |
| 5,191,817 A * | 3/1993 | Kojima et al. | ................. | 82/1.11 |
| 5,351,376 A * | 10/1994 | Kitamura | .................... | 29/27 C |
| 6,021,695 A * | 2/2000 | Kosho et al. | ................... | 82/122 |
| 6,082,939 A * | 7/2000 | Nakashima et al. | .......... | 409/134 |
| 6,626,075 B2 * | 9/2003 | Hirose et al. | ................... | 82/118 |
| 6,877,407 B2 * | 4/2005 | Nakaminami et al. | ......... | 82/117 |
| 2002/0011137 A1 * | 1/2002 | Nakaminami et al. | ......... | 82/117 |
| 2002/0129686 A1 * | 9/2002 | Li | ............................... | 82/117 |
| 2003/0134731 A1 * | 7/2003 | Komine | ....................... | 483/27 |
| 2004/0231473 A1 * | 11/2004 | Geibler et al. | ................ | 82/124 |
| 2008/0213057 A1 * | 9/2008 | Betschon et al. | ............ | 409/232 |

FOREIGN PATENT DOCUMENTS

| | | | | |
|---|---|---|---|---|
| DE | 3834342 | A1 | * | 4/1990 |
| EP | 65659 | A1 | * | 12/1982 |
| JP | 59088201 | A | * | 5/1984 |
| JP | 61086103 | A | * | 5/1986 |
| JP | 62-198032 | U | | 12/1987 |
| JP | 2606511 | B2 | | 5/1997 |
| JP | 3206154 | B2 | | 9/2001 |
| JP | 2005-66769 | A | | 3/2005 |

* cited by examiner

*Primary Examiner*—Jason Daniel Prone
*Assistant Examiner*—Jennifer Swinney
(74) *Attorney, Agent, or Firm*—Westerman, Hattori, Daniels & Adrian, LLP

(57) ABSTRACT

The present invention provides a lathe which accumulates a reduced amount of chips on a slide member serving as a tool holder mounting base and which enables a reduction in the forward-backward dimension of the entire lathe. A lathe includes a spindle 2 that rotatably supports a workpiece and processing means 4 located in front of the spindle 2. The lathe moves one or both of the spindle 2 and the processing means 4 forward and backward to execute machining on the workpiece. The processing means 4 includes a tool 40, a tool holder 41 that supports the tool 40, and a slide member 42 which is slidable in a lateral direction and which supports the tool holder 41. The slide member 42 has an inclined surface 42c that is positioned lower as the inclined surface 42c approaches the spindle 2 and on which the tool holder 41 is mounted and supported.

6 Claims, 5 Drawing Sheets

LATHE

FIELD OF THE INVENTION

The present invention relates to the configuration of a tool feeding shaft of a lathe having a spindle provided in a horizontal direction

BACKGROUND OF THE INVENTION

Conventional lathes having a spindle facing in a horizontal direction are generally of what is called a horizontal bed type in which a tool feeding shaft (X axis and Z axis) is located in a horizontal plane. In one lathe of the horizontal bed type (the Unexamined Japanese Utility Model Application Publication (Jikkai-Sho) No. 62-198032), a plurality of tool holders are arranged in the direction of the X axis. In this lathe, a cross slide that is a member constituting a base on which the tool holders are mounted is horizontally installed in a processing area, and the tool holders are fixed on the cross slide.

Where the cross slide is horizontally installed as in the case of the lathe in accordance with the Unexamined Japanese Utility Model Application Publication (Jikkai-Sho) No. 62-198032, chips generated during processing are likely to accumulate on the cross slide. The chips accumulated on the cross slide may affect the processing. Particularly in automated facilities, the accumulated chips may seriously affect processing accuracy and safety. To remove the chips accumulated on the cross slide, it is possible to provide a space opposite a spindle with reference to the cross slide so that the chips on the cross slide can be dropped in the space. For example, where the cross slide is provided in front of the spindle, the chip dropping space is provided in front of the cross slide. However, disadvantageously, the provision of the chip dropping space correspondingly increases the forward-backward dimension of the machine.

SUMMARY OF THE INVENTION

It is an object of the present invention to provide a lathe which accumulates a reduced amount of chips on a slide member such as a cross slide which serves as a tool holder mounting base and which enables a reduction in the forward-backward dimension of the entire lathe. It is another object of the present invention to eliminate the need for a chip dropping space located in front of the slide member, enabling a further reduction in forward-backward dimension. It is yet another object of the present invention to fix the position of processing means in the forward-backward direction, enabling a further reduction in forward-backward dimension. It is still another object of the present invention is to compactly mount a tool and a tool holder on the slide member.

The present invention provides a lathe comprising a spindle that rotatably supports a workpiece and processing means located in front of the spindle, the lathe moving one or both of the spindle and the processing means forward and backward to execute machining on the workpiece, wherein the processing means comprises a tool, a tool holder that supports the tool, and a slide member which is slidable in a lateral direction and which supports the tool holder, the slide member having an inclined surface that is positioned lower as the inclined surface approaches the spindle and on which the tool holder is mounted and supported. In this configuration, the tool holder is mounted and supported on the inclined surface that is positioned lower as the inclined surface approaches the spindle of the slide member. Consequently, chips generated when the workpiece supported by the spindle is machined using the tool fall downward along the inclined surface of the slide member. This makes the chips unlikely to accumulate on the slide member, eliminating the adverse effect of the chips on the processing. Further, the tool holder mounting surface of the slide member is inclined. This ensures that the tool holder mounting surface is long enough to mount the tool holder thereon in spite of the short forward-backward dimension of the slide member. This enables a reduction in the forward-backward dimension of the slide member and a corresponding reduction in the forward-backward dimension of the lathe.

In the present invention, the lathe may have a machine body cover comprising an integral cover or a plurality of partial covers which cover the spindle and the processing means, and a front portion of the machine body cover may be mounted in tight contact with a front surface of a bed member supporting the slide member. This configuration eliminates the need for the space between the bed member supporting the slide member and the front portion of the machine body cover. This enables a reduction in the forward-backward dimension of the lathe. The inclined surface of the slide member is positioned lower as the inclined surface approaches the spindle. Chips fall toward the spindle side, that is, rearward along the inclined surface. This eliminates the need to provide a chip dropping space in front of the slide member. Thus, as described above, the front portion of the machine body cover can be mounted in tight contact with the front surface of the bed member.

Further, in the present invention, the spindle may be movable forward and backward and a position of the processing means in a forward-backward direction may be fixed. This configuration fixes the position of the processing means in the forward-backward direction. This eliminates the need to provide, in front of the processing means, a space through which the processing means can move. This enables a reduction in the forward-backward dimension of the lathe.

In the present invention, when viewed from the lateral direction, the tool holder may be shaped like a substantial right triangle having an inclined external surface that contacts with the inclined surface of the slide member, a vertical external surface that extends upward upright from a lower end of the inclined external surface, and a horizontal external surface formed between an upper end of the vertical external surface and an upper end of the inclined external surface, and the tool holder has a tool support portion provided in an upper part thereof to horizontally support the tool. In this configuration, the tool holder is shaped like the substantial right triangle. This allows the tool holder to be compactly mounted so as not to project toward the spindle side or upward from the slide member. Further, where the tool is horizontally supported by the tool support portion provided in the upper part of the tool holder, the tool support portion can be ensured to be long enough to reliably support the tool.

According to the present invention, the lathe comprises the spindle that rotatably supports the workpiece and the processing means located in front of the spindle, and moves one or both of the spindle and the processing means forward and backward to execute machining on the workpiece. The processing means comprises the tool, the tool holder that supports the tool, and the slide member which is slidable in the lateral direction and which supports the tool holder, the slide member having the inclined surface that is positioned lower as the inclined surface approaches the spindle and on which the tool holder is mounted and supported. This makes it possible to reduce the amount of chips accumulated on the slide member and the forward-backward dimension of the entire lathe.

When the lathe has the machine body cover comprising the integral cover or the plurality of partial covers which cover the spindle and the processing means, and the front portion of the machine body cover is mounted in tight contact with the front surface of the bed member supporting the slide member, the forward-backward dimension can further be reduced.

Further, where the spindle is movable forward and backward and the position of the processing means in the forward-backward direction is fixed, the forward-backward dimension can further be reduced.

Moreover, when viewed from the lateral direction, the tool holder is shaped like the substantial right triangle having the inclined external surface that contacts the inclined surface of the slide member, the vertical external surface that extends upward upright from the lower end of the inclined external surface, and the horizontal external surface formed between the upper end of the vertical external surface and the upper end of the inclined external surface, and the tool holder has the tool support portion provided in the upper part thereof to horizontally support the tool, then the tool and the tool holder can be compactly mounted on the slide member.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
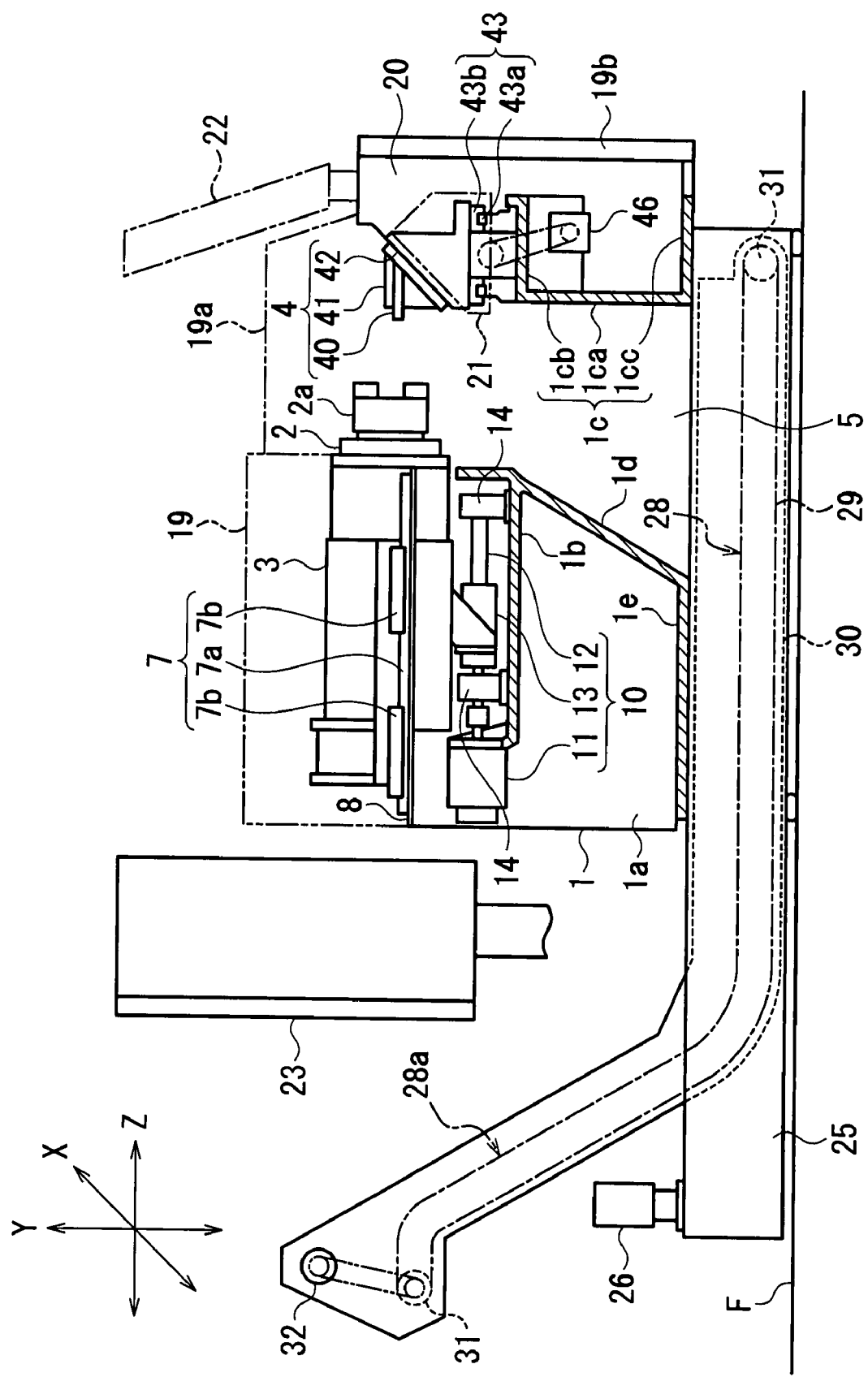
FIG. 1 is an exploded side view of a lathe in accordance with an embodiment of the present invention.
Figure 2:
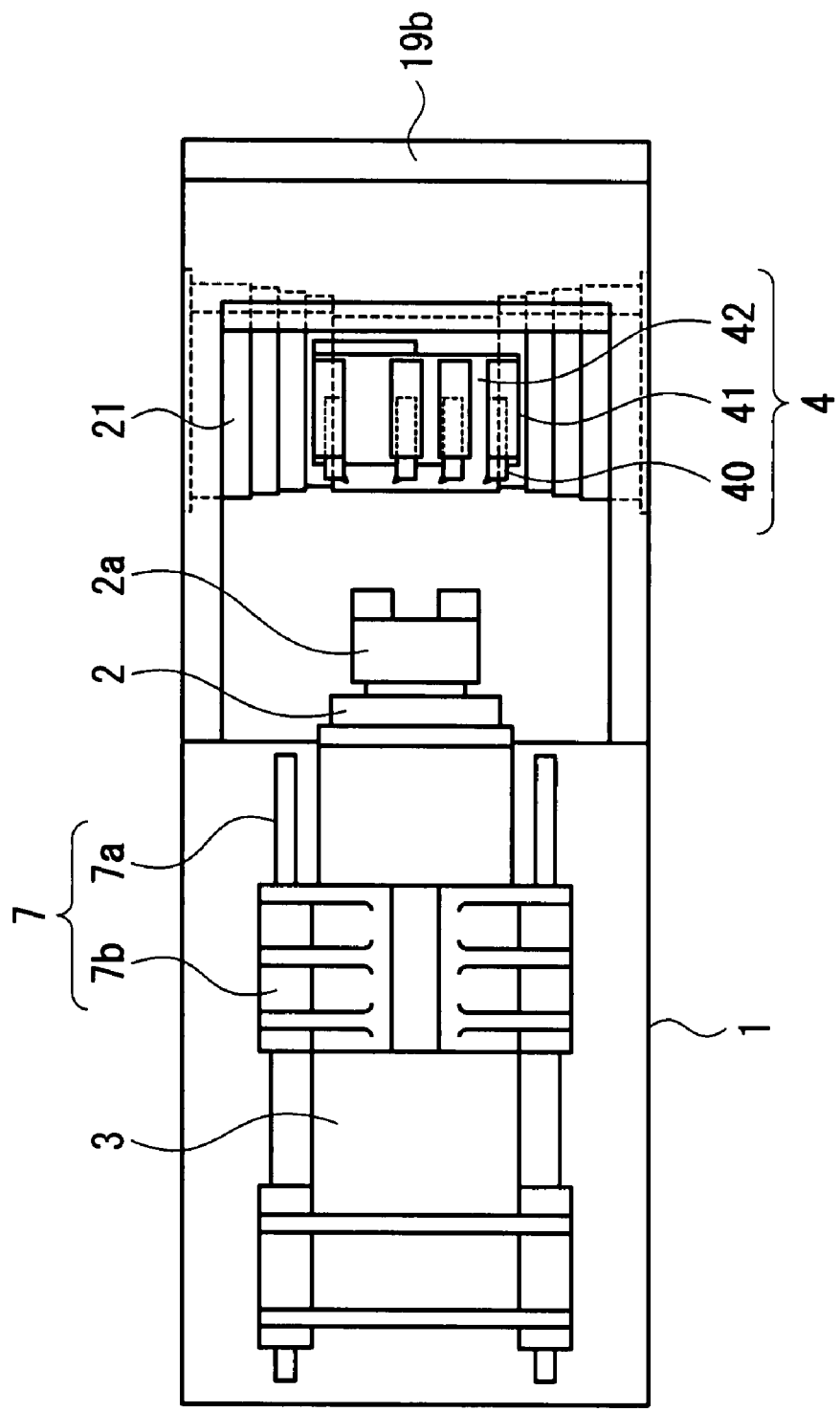
FIG. 2 is a plan view of the lathe.

An embodiment of the present invention will be described with reference to FIG. 1 to FIG. 4. The lathe has a headstock 3 supporting a spindle 2 and installed on a bed 1 so as to be movable forward and backward (the direction of a Z axis). The spindle 2 faces in the forward-backward direction (the direction of a Z axis). A spindle chuck 2a is provided at a front end of the spindle 2. A processing means 4 is provide in front of the spindle 2.

The bed 1 is shaped like a box having a pair of opposite side plate portion 1a, a top plate portion 1b provided in the rear of the side plate portions 1a between upper ends of the side plate portions 1a, and a front plate portion 1c provided between front ends of the opposite side plate portions 1a. The front plate portion 1c has a vertical upright portion 1ca, an upper end horizontal portion 1cb horizontally extended forward from an upper end of the vertical upright portion 1ca, and a lower end horizontal portion 1cc horizontally extended forward from a lower end of the vertical upright portion 1ca. The entire shape of the front plate portion 1c is such that the front plate portion 1c has a U-shaped cross section. An intermediate upright plate portion 1d extends obliquely downward and rearward from a front end of the top plate portion 1b. A lower end of the top plate portion 1b connects to a bottom plate portion 1e. A space 5 between the front plate portion 1c and the intermediate plate portion 1d of the bed 1 constitutes a discharge space into which chips generated during lathe processing are discharged. A bed lower portion corresponding to a portion below the bottom plate portion 1e of the bed 1 constitutes a lateral pair of leg portions 1f. A coolant tank arrangement space is provided between the lateral pair of leg portions 1f.

The headstock 3 rotatably supports the spindle 2 and contains a spindle motor (not shown in the drawings) that rotates the spindle 2. The headstock 3 is installed on the top plate portion 1b of the bed 1 so as to be movable forward and backward in the forward-backward direction via a spindle guiding means 7. The spindle guiding means 7 is composed of a pair of forward-backward guide rails 7a provided on the right and left sides of the headstock 3 so as to extend in the forward-backward direction, and guided members 7b which project from laterally opposite surfaces of the headstock 3 and which are movable forward and backward on the guide rails 7a. The guided members 7b are composed of, for example, direct-acting roller bearings. The forward-backward guide rails 7a are installed on lateral guide means support mounts 8 provided on the top plate portion 1b of the bed 1. The guided members 7b are provided on the right and left sides of the headstock 3 in each of the front and rear portions thereof. The height position of each guided member 7b is substantially the same as that of the axis of the spindle 2.

A forward-backward moving mechanism 10 that moves the headstock 3 forward and backward is provided below the headstock 3. The forward-backward moving mechanism 10 is composed of a spindle advancement and retraction driving motor 11, a ball screw 12, and a nut 13. The ball screw 12, which faces in the forward-backward direction, is rotatably supported by a mount 14 installed on the top plate portion 1b of the bed 1. The nut 13 attached to a bottom surface of the headstock 3 is threadably fitted around the ball screw 12. The spindle advancing and retracting motor 11 is used to rotate the ball screw 12 to move the nut 13 threadably fitted around the ball screw 12, forward and backward. This correspondingly moves the headstock 3 forward and backward. The forward-backward moving mechanism 10 may also be a linear motor.

The processing means 4 is composed of a tool 40, a tool holder 41 that supports the tool 40, and a slide member 42 that supports the tool holder 41. The slide member 42 is provided on the bed 1 so as to be slidable in a lateral direction via a slide member guiding means 43. The slide member guiding means 43 is composed of a front-rear pair of slide guide rails 43a laterally and horizontally installed on the upper end horizontal portion 1cb of the bed front plate portion 1c, and guided members 43b mounted on a bottom surface of the slide member 42. The guided members 43b are composed of, for example, direct acting type roller bearings.

Figure 3:
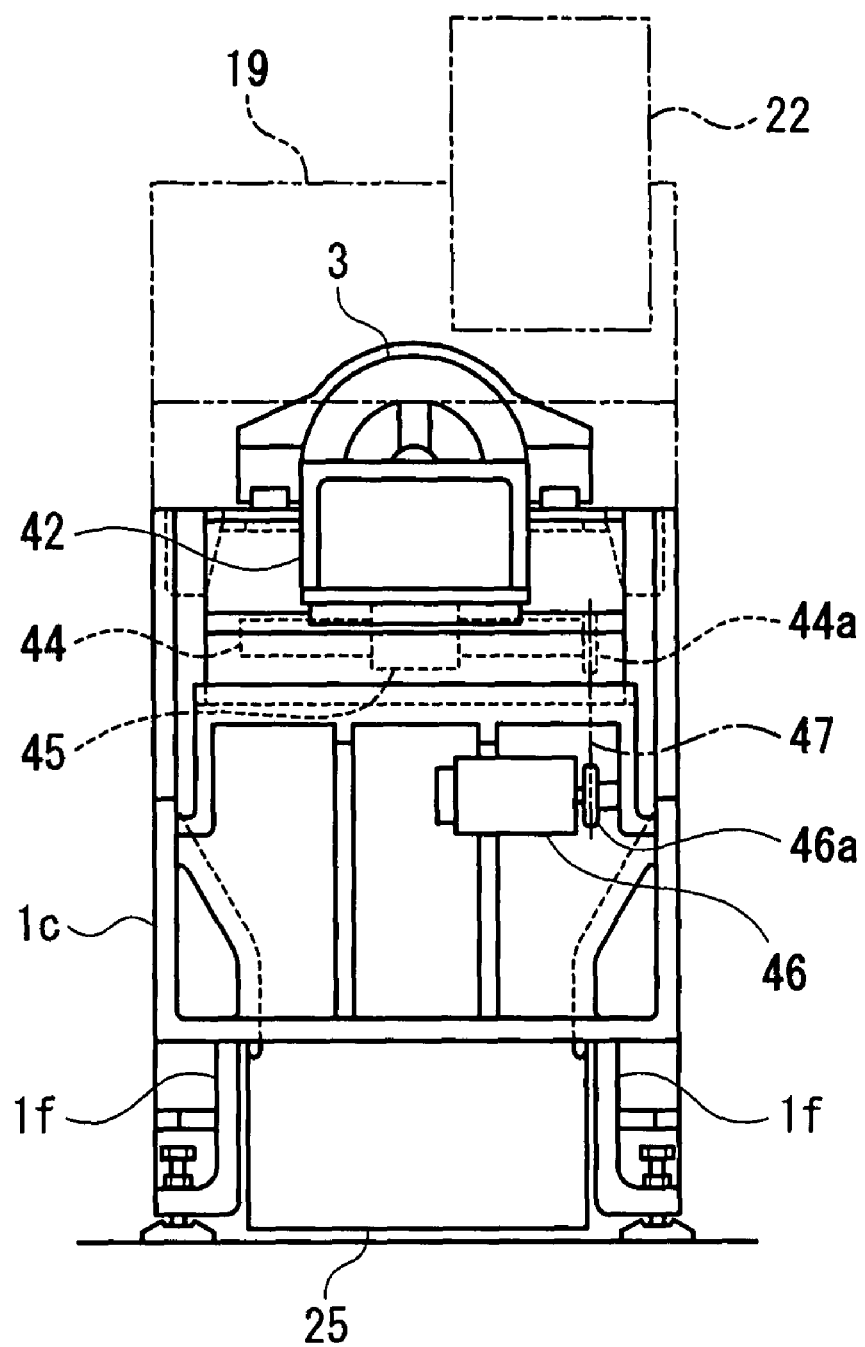
FIG. 3 is a front view of the lathe.
Figure 4:
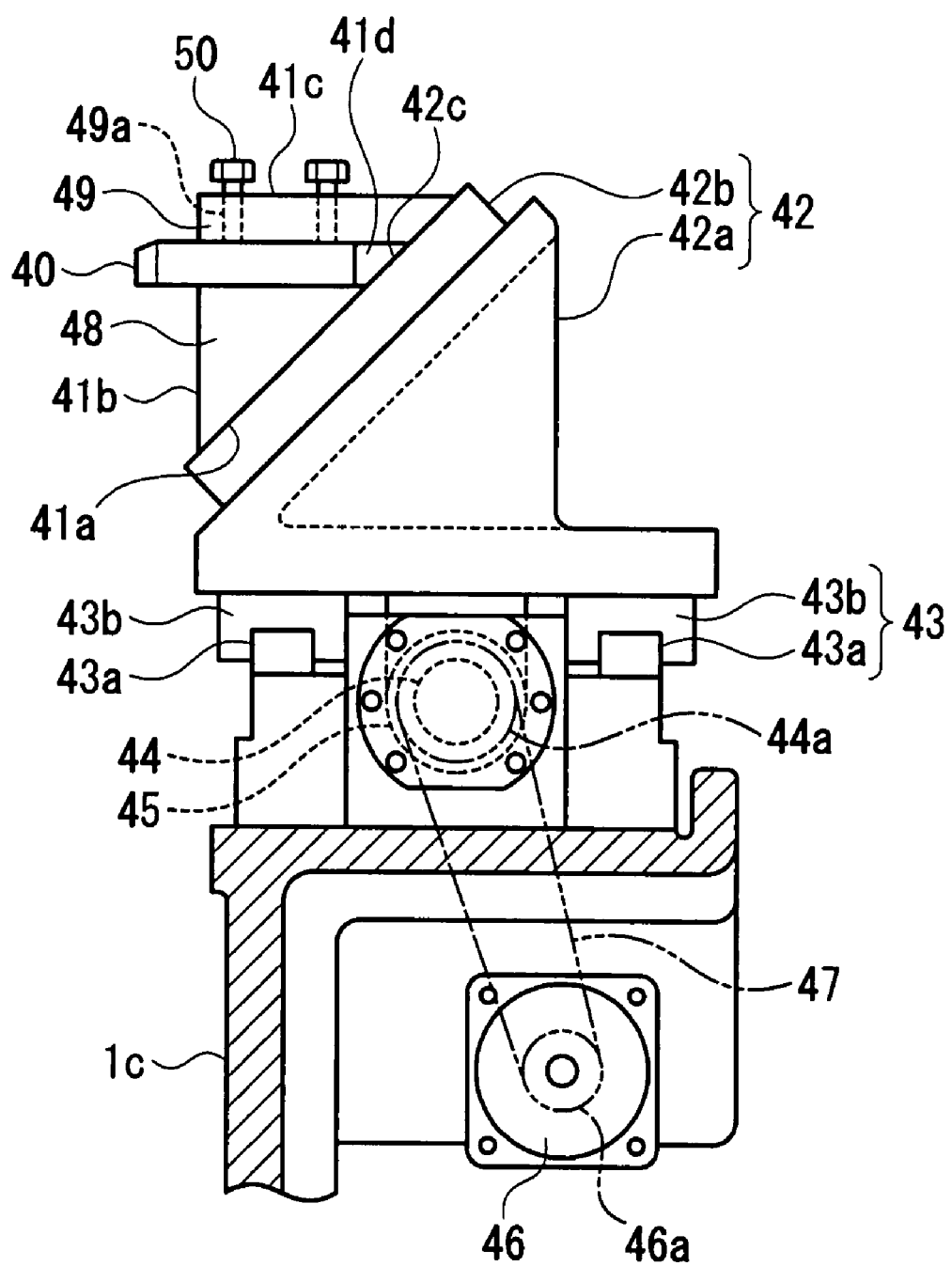
FIG. 4 is an enlarged side view of processing means of the lathe.

As shown in FIG. 3 and FIG. 4, a slide means for sliding the slide member 42 rightward and leftward includes a screw shaft 44, a nut 45, and a slide motor 46. The screw shaft 44 is threaded on its outer periphery and faces in the lateral direction, and the screw shaft 44 is rotatably supported between a pair of slide guide rails 43a. The nut 45 is mounted on a bottom surface of the slide member 42 and threadably fitted around the screw shaft 44. The slide motor 46 is provided below the screw shaft 44. A transmission chain 47 is placed between a ratchet wheel 46a attached to a motor shaft of the slide motor 46 and a ratchet wheel 44a attached to the screw shaft 44. Rotation of the slide motor 46 rotates the screw shaft 44 to move the nut 45 along the screw shaft 44. This slides the slide member 42 rightward and leftward.

The slide member 42 is composed of a body portion 42a having a bottom surface on which the guided members 43b are mounted, and a tool holder mounting plate 42b integrally fixed to a rear-side surface of the body portion 42a. The rear-side surface of the body portion 42a is an inclined surface extending obliquely forward from a lower end of the body portion 42a. Accordingly, a tool holder mounting surface 42c of the tool holder mounting plate 42b is the inclined surface that is positioned lower as the inclined surface approaches the spindle 2.

When viewed from the lateral direction, the tool holder 41 is shaped like a substantial right triangle having an inclined external surface 41a that contacts with the tool holder mounting surface 42c of the slide member 42, a vertical external surface 41b extending upward upright from a lower end of the inclined external surface 41a, and a horizontal external surface 41c formed between an upper end of the vertical external surface 41b and an upper end of the inclined external surface 41a. A tool support portion 41d provided in an upper part of the tool holder 41 horizontally supports the tool 40. A support structure for the tool 40 is such that the tool 40 is sandwiched between a base member 48 constituting a lower part of the tool support portion 41d and a cover member 49 constituting an upper part of the tool support portion 41d and such that bolts 50 are inserted, from above, into bolt holes 49a formed in the cover member 49 so that tips of the bolts 50 are pressed against the tool 40 to fix the tool 40.

A space above the headstock 3 and the processing means 4 is covered with a machine body cover 19. A portion of the machine body cover 19 which is located in front of the bed top plate portion 1b constitutes an openable and closable front door 19a. Further, a front cover 19b in the front of the machine body cover 19 is provided slightly in front of the bed front plate portion 1c. The space 20 between the front cover 19b and the processing means 4 serves as a chip dropping space. A chip scatter preventing cover 21 is provided between the slide member 42 and the right and left bed side plate portions 1a to guide chips to the chip discharging space 5 or the chip dropping space 20 in order to prevent the chips from scattering. The chip scatter preventing cover 21 is formed so as to be expanded and contracted in response to movement of the slide member 42.

An operation panel 22 is installed on the front cover 19. Further, a control panel 23 is installed along a rear surface of the bed 1 to control the lathe. The control panel 23 may be mounted on the bed 1 via a mounting member (not shown in the drawings) or installed on a floor surface via a mount (not shown in the drawings).

A coolant tank 25 is mounted on a bottom surface of the bed 1 so as to lie above the floor surface F. The coolant tank 25 extends from a front end to a rear end of the bed 1 and further projects rearward from the bed 1. A circulating motor 26 is provided at a rear end of the coolant tank 25 to circulate a coolant inside the coolant tank 25. A top surface portion of the coolant tank 25 which faces the chip discharging space 5 of the bed 1 is open.

A chip conveyor 28 is provided inside the coolant tank 25. The chip conveyor 28 has an endless conveyor pivoting member composed of a net, a holed belt, or the like to allow oil to pass through, while inhibiting the passage of chips; the conveyor pivoting member 29 is provided in a conveyor case 30 so as to be pivotable via guides 31. The conveyor pivoting member 29 is pivotably driven by a conveyor driving motor 32 provided at a rear end of the chip conveyor 28. The top surface of a portion of the conveyor case 30 for the chip conveyor 28 is open which portion corresponds to the chip discharging space 5 of the bed 1. The chip conveyor 28 has an inclined portion 28a inclined upward and projecting rearward from the bed 1. Chips on the conveyor pivoting member 29 are discharged to the exterior from an upper end of the inclined portion 28a.

The lathe performs a turning operation by moving the headstock 3 forward and backward and sliding the processing means 4 rightward and leftward to move a workpiece (not shown in the drawings) supported on the spindle 2, in a direction in which the tool 40 is fed and in a direction in which the tool 40 cuts the workpiece. Chips generated during the turning operation fall onto the chip conveyor 28 through the chip discharging space 5. The chips are carried by the chip conveyor 28 and discharged to the exterior.

Since the tool holder mounting surface 42c of the slide member 4 is the inclined surface that is positioned lower as the inclined surface approaches the spindle 2, chips fall downward along the inclined surface. Thus, the chips are unlikely to accumulate on the slide member 42. This prevents the processing from being affected by the chips. Where the chips accumulate on a horizontal portion such as the cover member 49 of the tool holder 41, the front door 19a may be opened and the chips may be scrubbed off into the chip discharging space 5 or the chip discharging space 20. Since the chip scatter preventing cover 21 is provided, the chips falling on the laterally opposite sides of the slide member 42 are smoothly guided to the chip discharging space 5 or the chip discharging space 20.

In the lathe, the tool holder mounting surface 42c of the slide member 42 is inclined. Thus, in spite of the short forward-backward dimension of the slide member 42, the tool holder mounting surface 42c can be ensured to be long enough to mount the tool holder 41 thereon. This enables a reduction in the forward-backward length of slide member 42 and a corresponding reduction in the forward-backward dimension of the lathe.

Further, the position of the processing means 4 in the forward-backward direction is fixed, and processing is performed by moving the spindle 2 in the forward-backward direction. This eliminates the need for a space through which the processing means 4 is movable, in front of the processing means 4. This enables a reduction in the forward-backward dimension of the lathe.

The tool holder 41 is shaped like the substantial right triangle when viewed from the lateral direction. This allows the tool holder 41 to be compactly mounted so as not to project toward the spindle 2 side or upward from the slide member 42. Further, the tool 40 is horizontally supported by the tool support portion 41d provided in the upper part of the tool holder 41. Thus, the tool support portion is 41d can be ensured to be long enough to reliably support the tool 40.

Figure 5:
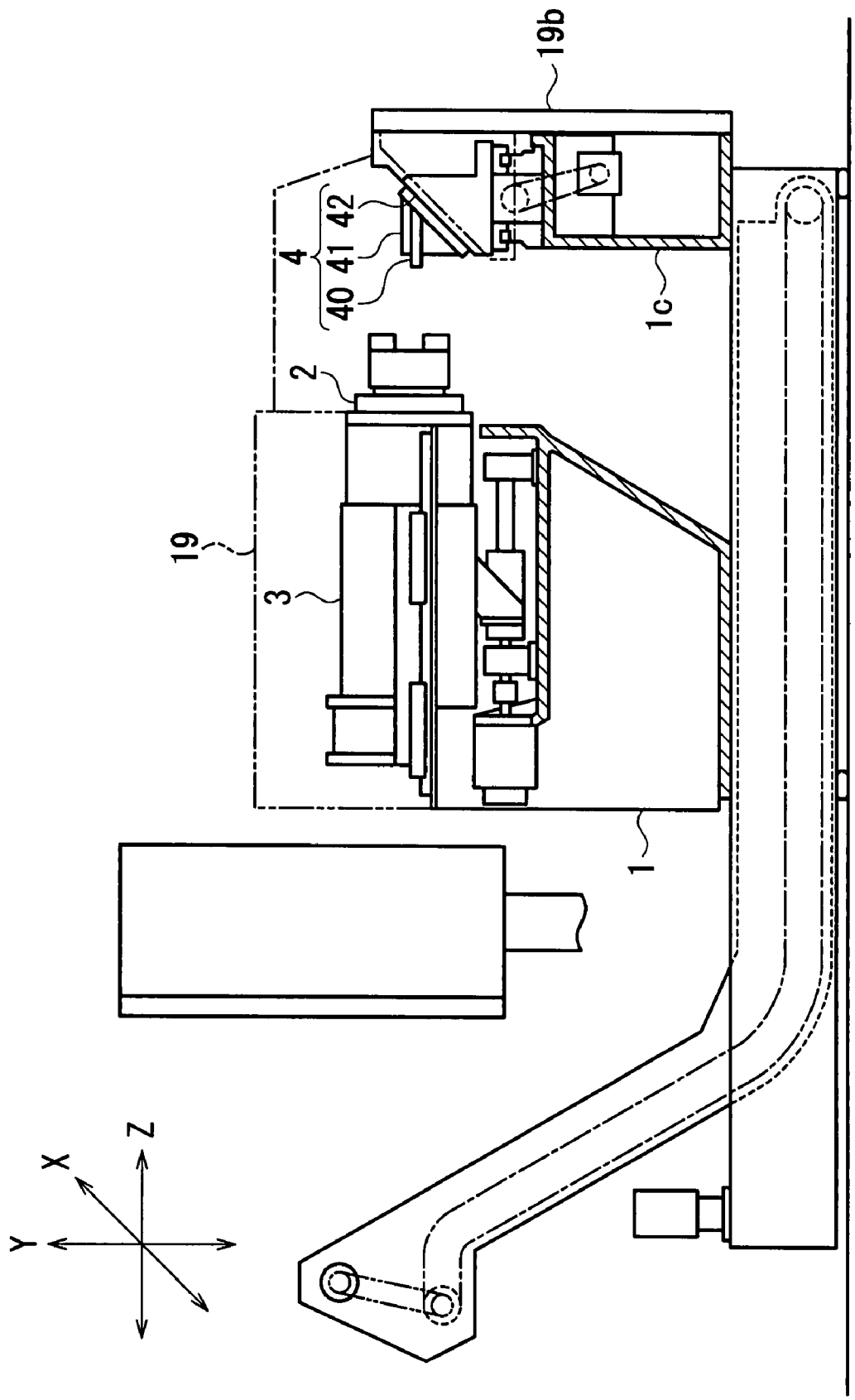
FIG. 5 is an exploded side view of a lathe in accordance with a different embodiment of the present invention.

FIG. 5 shows a different embodiment of the present invention. In this lathe, the front cover 19b in the front of the machine body cover 19 is mounted in tight contact with the front surface of the bed front plate portion 1c, which is a bed member supporting the slide member 42. Accordingly, no chip dropping space is provided in front of the slide member 42. This enables a corresponding reduction in the forward-backward dimension of the entire lathe. As previously described, chips fall toward the spindle 2 side, that is, rearward along the tool holder mounting surface 42c of the slide member 42. Consequently, the absence of the chip dropping space in front of the slide member 42 does not pose any problem. In this case, the chip scatter preventing cover 21 is provided so as to guide chips to the chip discharging space 5.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A lathe, comprising:
    a spindle that rotatably supports a workpiece, and
    a processing means located in front of the spindle,
    wherein said spindle is movable in a forward-backward direction, and a position of said processing means in the forward-backward direction is fixed to execute machining on the workpiece,
    wherein said processing means comprises a tool, a tool holder that supports the tool, and a slide member which is slidable in a direction orthogonal to the forward-backward direction and on which the tool holder is mounted and supported, and
    wherein the slide member has an inclined surface that is positioned with a lower end closer to said spindle than an upper end, in the forward-backward direction.

2. A lathe according to claim 1, further comprising a machine body cover including an integral cover or a plurality of partial covers which cover said spindle and said processing means,
    wherein a front portion of the machine body cover is mounted in tight contact with a front surface of a bed member supporting said slide member.

3. A lathe according to claim 2,
    wherein said processing means is located on an axis of said spindle.

4. A lathe according to claim 1,
    wherein when viewed from the direction orthogonal to the forward-backward direction, said tool holder has a substantially right triangle shape including an inclined external surface that contacts the inclined surface of said slide member, a vertical external surface that extends upward from a lower end of the inclined external surface, and a horizontal external surface formed between an upper end of the vertical external surface and an upper end of said inclined external surface, and
    wherein said tool holder has a tool support portion provided in an upper part thereof to horizontally support the tool.

5. A lathe according to claim 4,
    wherein said processing means is located on an axis of said spindle.

6. A lathe according to claim 1,
    wherein said processing means is located on an axis of said spindle.

* * * * *